United States Patent [19]
Lindbert et al.

[11] 3,862,669
[45] Jan. 28, 1975

[54] OCCUPANT RESTRAINT SYSTEM

[75] Inventors: Brook A. Lindbert, Utica; Wesley L. McCollum, Brighton; Edward H. Mertz, Birmingham, all of Mich.

[73] Assignee: General Motors Corporation, Detroit, Mich.

[22] Filed: Nov. 24, 1972

[21] Appl. No.: 309,456

[52] U.S. Cl. ............ 180/91, 188/1 C, 280/150 AB, 293/2, 293/69 V, 293/73
[51] Int. Cl. ........................................... B60r 21/08
[58] Field of Search ...... 280/150 AB; 180/82 R, 91, 180/94; 293/1, 2, 60, 63, 69 V, 70, 73, 85; 188/1 C

[56] References Cited
UNITED STATES PATENTS

| | | | |
|---|---|---|---|
| 3,097,725 | 7/1963 | Peterson | 188/1 C |
| 3,146,014 | 8/1964 | Kroell | 293/70 |
| 3,495,474 | 2/1970 | Nishimura | 180/91 |
| 3,495,675 | 2/1970 | Hass | 180/103 |
| 3,654,412 | 4/1972 | Haruna | 180/91 |
| 3,700,273 | 10/1972 | Jackson | 293/89 |
| 3,718,332 | 2/1973 | Jones | 280/150 AB |

*Primary Examiner*—David Schonberg
*Assistant Examiner*—John P. Silverstrim
*Attorney, Agent, or Firm*—Herbert Furman

[57] ABSTRACT

A vehicle includes an inflatable occupant restraint, an impact bar receptive of impact forces, and a pair of telescopic piston and cylinder type struts mounting the impact bar on controlled mechanically deformable portions of the frame. Diaphragm sealed passages communicate the struts with the inflatable restraint. The cylinders of the struts contain a pressure fluid medium and are fixed to the deformable portion of the frame. The pistons are secured to the impact bar and move within the fluid medium to absorb lower level impact forces. Shear rings engaged by the pistons limit the stroke thereof and set the limit of absorption of lower level forces by the struts. When the pistons engage the shear rings, the impact forces are transferred through the struts to the deformable portion of the frame for mechanical deformation thereof and the absorption of higher level impact forces. The cylinders communicate with the restraint across rupturable diaphragms. Piercing rods are mounted on the pistons in spaced relationship to the diaphragms. When the pistons engage the shear ring, the piercing rods remain spaced from the diaphragms. The shear rings fail at the high level energy absorption limit of the frame and the pistons then move the piercing rods into the diaphragms to rupture them and permit flow of the pressure fluid medium from the cylinders to the restraint.

7 Claims, 4 Drawing Figures

3,862,669

OCCUPANT RESTRAINT SYSTEM

This invention relates generally to occupant restraint systems and more particularly to such systems wherein lower level impact forces applied to the impact bar of the vehicle are absorbed by energy absorbing struts mounting such impact bar on the frame of the vehicle, higher lever impact forces are absorbed by the mechanical deformation of the frame, and an inflatable occupant restraint is inflated when the high level energy absorbing limit of the frame is exceeded.

The system of this invention, in its preferred embodiment, provides for inflation of an inflatable occupant restraint at a particular higher level force limit which is mechanically sensed. Lower level impact forces are absorbed by the pressurization of a pressure fluid medium contained within the strut cylinders and pressurized by the movement of the strut pistons within the cylinders. The cylinders are secured to controlled mechanically deformable portions of the vehicle frame and the pistons are secured to the bumper or impact bar of the vehicle. The stroke of the pistons is set by the engagement of the pistons with shear rings secured to the cylinders. This engagement sets the limit of absorption of lower level forces by the struts. The struts are self-restoring up to this limit. When the impact forces are higher level and exceed the lower level limit, the engagement of the pistons with the shear rings transfers the higher level impact forces to the controlled mechanically deformable portions of the frame to deform the frame and absorb such forces. The shear rings are set to fail at a set limit of absorption of higher level forces by the frame. This limit is indicative of the energy absorbing capability of the frame being exceeded and also indicative of a severity of impact at which it is desirable to inflate an occupant restraint. When the shear rings fail, the pistons are released for further movement within the cylinders and piercing rods secured to the pistons rupture diaphragms to release the pressure fluid medium from the cylinders for flow to the restraint and inflation thereof. The shear rings thus act as mechanical sensors to sense the levels of impact forces applied to the vehicle through engagement of the impact bar with an obstacle and to provide for inflation of an occupant restraint when such force levels exceed a predetermined or set higher force level limit. Lower level impact forces up to the lower level force limit are absorbed through pressurization of the fluid medium and higher level forces up to the higher level force limit are absorbed by mechanical deformation of the frame, with such force level limits being sensed or set by the shear ring.

The primary feature of this invention is that it provides an improved occupant restraint system wherein lower level impact forces are absorbed by the energy absorbing capability of a pressurizable fluid medium and higher level impact forces are absorbed by the mechanical deformation of the frame of the vehicle, with the forces being transferred to the frame of the vehicle through a shearable member which fails at a force level equal to or exceeding the energy absorption capability of the frame and provides for inflation of an occupant restraint when such force level is reached. Another feature of this invention is that the medium is pressurized through the movement of a piston within a cylinder and the pressurized fluid medium provides for inflation of the restraint. A further feature of this invention is that the fluid medium is pressurized by the movement of a piston within a cylinder and the shearable member limits the range of movement of the piston within the cylinder and transfers the impact forces to the frame when engaged by the piston. Yet another feature of this invention is that the communication of the fluid medium with the restraint is controlled by the piston when the shearable member fails. Still a further feature of this invention is that the shearable member is trapped between the piston and the cylinder upon failure thereof.

These and other features of this invention will be readily apparent from the following specification and drawings wherein.

Figure 1:
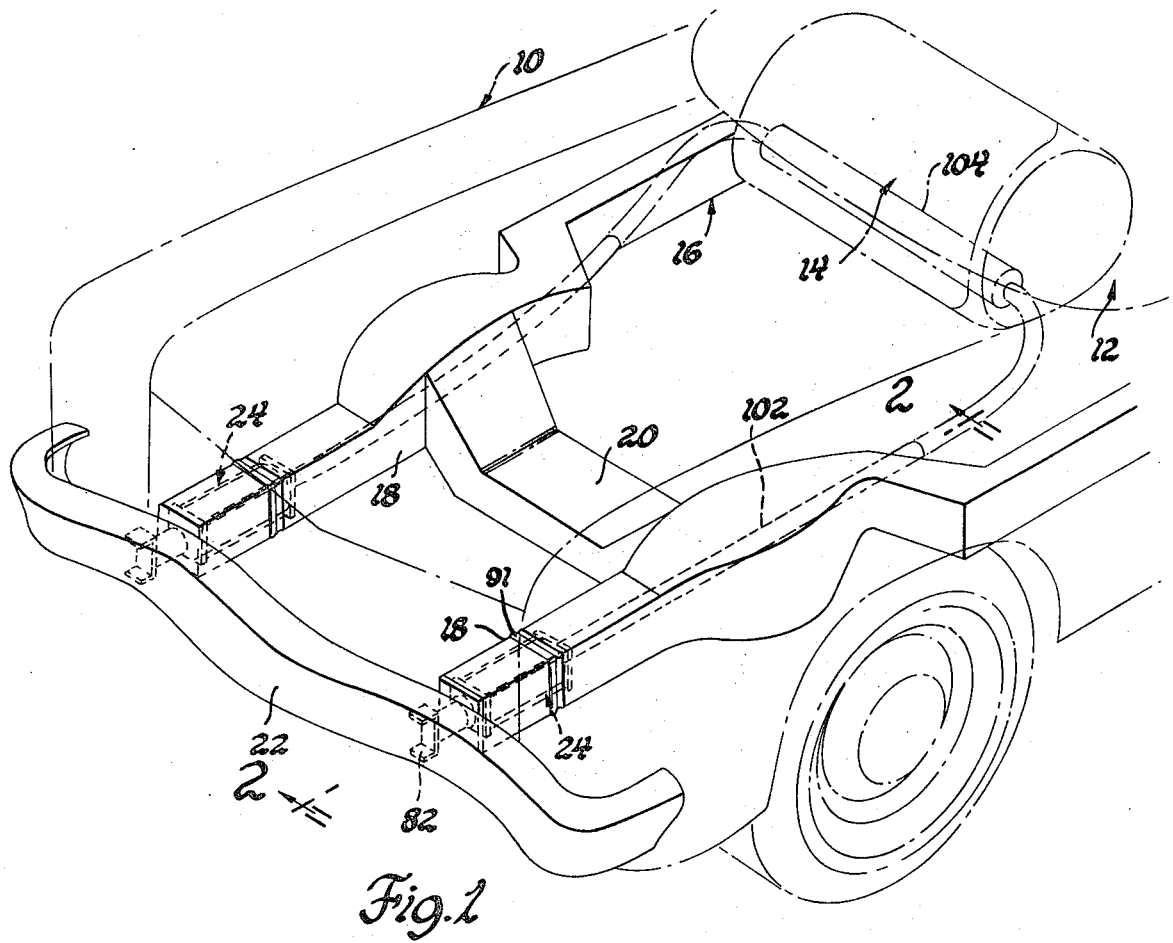
FIG. 1 is a partial perspective view of a vehicle embodying an occupant restraint system according to this invention.

Referring now particularly to FIG. 1 of the drawings, a vehicle designated generally 10 includes an occupant compartment 12 in which is mounted a conventional inflatable occupant restraint cushion 14, shown inflated. The cushion 14 is conventionally mounted on the instrument panel or other area of the occupant compartment for use by vehicle occupants in the event that impact of the vehicle 10 with an obstacle generates impact forces exceeding a predetermined higher level. Such cushions are well known and the manner in which such cushions operate is likewise well known. Although the particular cushion shown is intended for use by the front seat occupants of the vehicle, it is believed apparent that other types of cushions for the driver and rear seat passengers may likewise be used with the system of this invention.

The vehicle 10 further includes a frame 16 which includes a like pair of forwardly extending frame rails 18 interconnected at one or more places by cross frame members 20. The vehicle further includes an impact bar or front bumper 22 which traverses the front end of the vehicle 10 and the forward ends of the rails 18. The impact bar 22 is mounted on the frame rails by like energy absorbing devices or struts 24 which absorb lower level impact forces generated by impact of the bar 22 with an obstacle. Should the impact forces exceed this lower level, they are absorbed by controlled mechanical deformation of the frame rails 18 and, should the impact forces exceed a higher level, the cushion 14 will thereupon be inflated.

Figure 2:
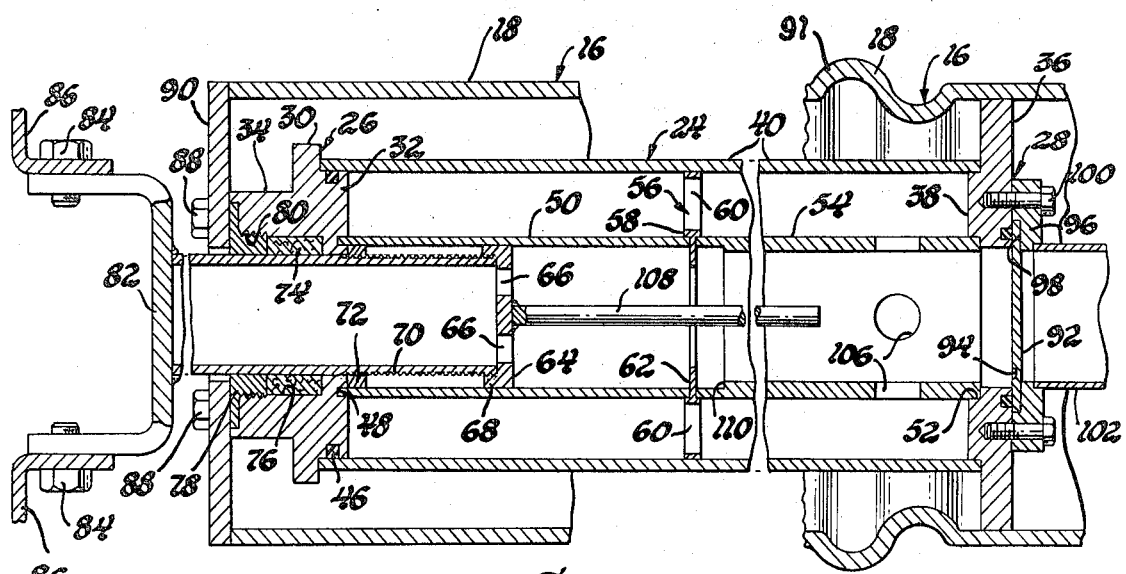
FIG. 2 is an enlarged sectional view taken generally along the plane indicated by line 2—2 of FIG. 1.
Figure 3:
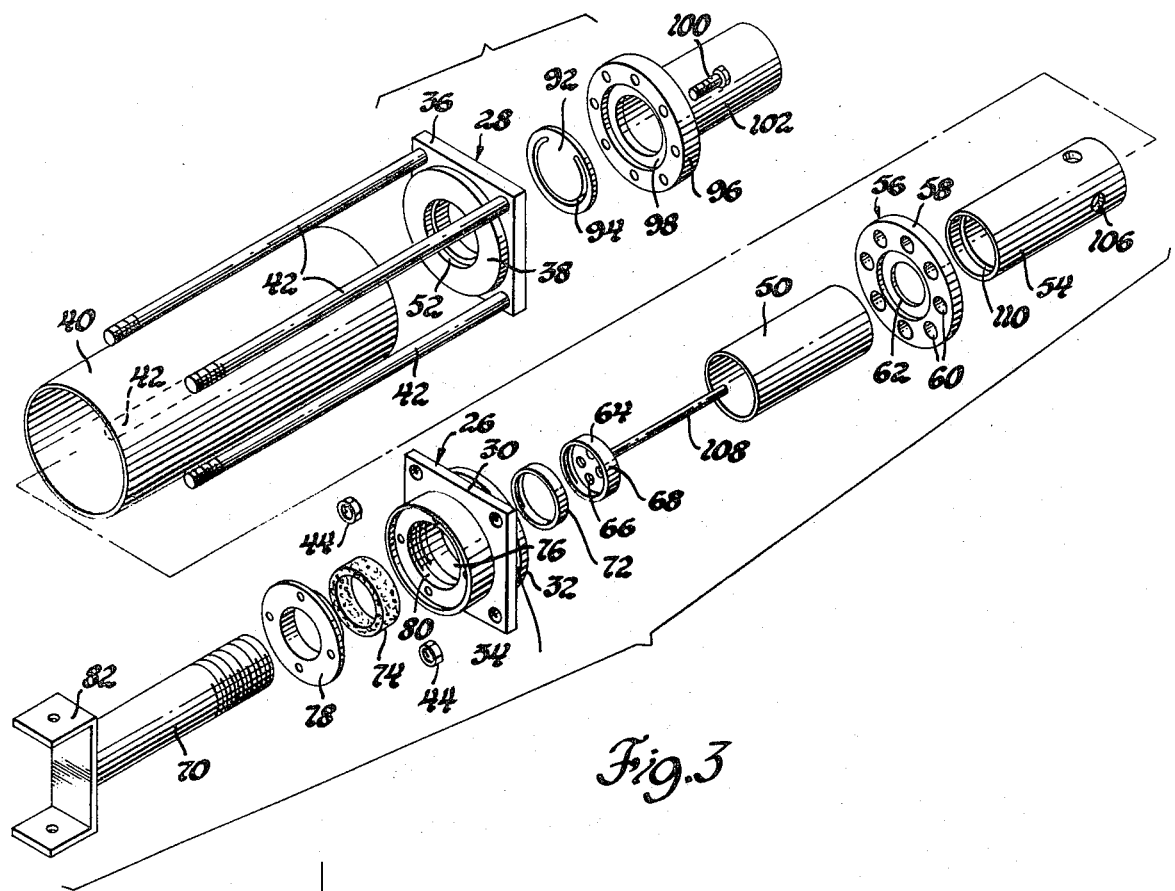
FIG. 3 is an exploded perspective view.

Since the struts are the same, only the left-hand one will be described in detail. Referring now particularly to FIGS. 2 and 3 of the drawings, strut 24 includes forward and rearward centrally apertured end plates 26 and 28 respectively. The forward end plate 26 includes a generally square shaped base portion 30 which is apertured at the four corners thereof. Plate 26 further includes a rearwardly extending circular portion or boss 32 and a forwardly extending circular portion or boss 34.

The rearward end plate 28 includes a generally square shaped base portion 36 and a circular portion or boss 38 of the same diameter as the circular portion 32. The open ends of an outer cylinder 40 receive the circular portions 32 and 38 of the end plates. Four rods 42 are secured at one end thereof within apertures in the four corners of the base portion 36 and extend through the aligned apertures in the corners of the base portion 30. The threaded ends of the rods receive nuts 44 to tightly clamp the outer cylinder 40 between the end plates 26 and 28. An O-ring seal 46 may further be provided between the cylinder 40 and the circular portion 32 to ensure a fluid-tight seal therebetween and other conventional type seals may be provided if necessary between the cylinder and the circular portion 38 for the same purpose.

The circular portion 32 further includes a circular groove 48 which receives one end of a first inner cylinder 50. The circular portion 38 includes an inner circular groove 52 which opens to the central aperture of plate 28 and receives one end of a second inner cylinder 54.

A shear member 56 includes an outer cylindrical portion 58 provided with a spaced series of apertures 60 and an inner centrally apertured integral web or shear ring 62 of predetermined thickness. The cylindrical portion 58 has an OD generally equal to the ID of the outer cylinder 40 and seats thereagainst, while the ring 62 is received and clamped between the adjacent other ends of the cylinders 50 and 54. The ID of the portion 58 is generally equal to the OD of the cylinders 50 and 54 to thereby align these cylinders relative to each other, the plates 28 and 30, and the cylinder 40.

A piston assembly includes a piston 64 which is slidably received within the cylinder 50. The piston includes a circumferential series of openings 66 and an internally threaded outer flange 68. The flange 68 is threaded on the outer threaded portion of a cylinder 70 of the piston assembly. Also threaded on the cylinder 70 is an internally threaded seal 72 which normally seats against the circular portion 32 to provide a stop for the piston assembly. Seal 72 seals against the inner surface of the cylinder 50. The cylinder 70 extends through the aperture of end plate 26 and is sealed thereto by a seal 74 contained within a counterbore 76 of the end plate and held in place by a flanged bushing 78 which is threaded into a threaded counterbore 80 of the end plate.

The outer end of the cylinder 70 is welded or otherwise secured to a U bracket 82 which in turn is bolted at 84 to an inner reinforcement 86 of the impact bar 22.

The energy absorbing strut 24 is received within the forward portion of the frame rail 18 as shown in FIG. 1. This forward portion is generally of square cross section and the rear end plate 28 is generally of the size of the frame rail as shown in FIG. 2 so as to be slidably received therein. Bolts 88 extend through openings in a forward rail plate 90 and in the flange of bushing 78 and are threaded into tapped openings of the end plate 26 to secure the strut 24 to the plate 90. The plate 90 is welded to the forward end of the rail 18 to thereby fixedly secure the strut 24 to the rail 18.

The forward portion of the rail 18 is provided with one or more corrugations 91 or openings or similar structure, to ensure that this portion of the frame rail will collapse at a controlled rate when a particular load is applied thereto to thereby absorb energy by mechanical deformation. For a showing of such structure, reference may be had to Ser. No. 309,499, (A-17,488), filed Nov. 24, 1972, Lindbert et al, and assigned to the assignee of this invention.

A diaphragm 92 covers the opening of the rear end plate 28. The diaphragm is a conventional metal diaphragm and as shown in FIG. 3 is coined or otherwise worked to provide a weakened line or groove 94 therein which opens inwardly of the end plate and extends for approximately 275°. A circular cap 96 includes a counterbore 98 which receives the edge portion of the diaphragm. Bolts 100 extend through apertures in the cap and into tapped openings in the end plate to tightly clamp the diaphragm between the cap and the end plate. As shown in FIG. 2, O-ring seals may be provided to further seal the diaphragm to the end plate 28.

A tube 102 is suitably secured within a counterbore of the cap 96 and extends rearwardly of the vehicle, either wholly or partially within the frame rail 18, to connection with one end of a conventional diffuser 104 received within the cushion 14. Such a diffuser includes slots or openings to provide for flow of pressure fluid for inflation of the cushion.

It will be understood that the cushion 14 is normally stored in the deflated position within a suitable housing of the occupant compartment of the vehicle around the diffuser 104.

The cylinder 40 contains a suitable pressurized fluid medium. In the particular embodiment shown, cylinder 40 is of a size to contain approximately 125 cubic inches of air or nitrogen at 2,100 psi. The openings 60 in the shear member 56 provide for flow of the pressure fluid therethrough and openings 106 in the cylinder 54 provide for cross flow between the cylinder 40 and the cylinder 54. The shear ring permits cross flow between cylinders 50 and 54 and the openings 66 provide for flow of the pressure fluid within the cylinder 70 so that the entire strut 24 is normally at a common pressure level. A piercing rod 108 is secured to piston 64 for a purpose to be described.

At low level impact forces, such as those up to a limit of 12,000 pounds, generated by engagement of the impact bar 22 with a fixed barrier at vehicle speeds up to 5 miles per hour, the piston assembly, cylinder 70 and piston 64 telescopically move within the cylinder 50 to pressurize the fluid medium and thereby absorb the energy of such impact forces. Normally the piston 64 is spaced approximately 2½ inches from the shear ring 62 and this is usually sufficient to prevent any engagement of the piston with the shear ring at such impact force levels. When the low level impact forces cease, the cylinder 70 and piston 64 move outwardly of the cylinder 48 to restore the impact bar 22 to its normal positional relationship to the front end of the vehicle 10. Thus, the strut 24 functions to absorb the energy of low level impact forces up to a predetermined lower level force limit, set herein at 12,000 pounds.

When higher level impact forces are applied to the impact bar 22, such as forces in the range from the predetermined lower level impact force limit, such as 12,000 pounds, up to a predetermined higher level impact force limit, such as 26,000 pounds, the piston 64 engages the shear ring 62. This blocks any further telescopic movement of the piston assembly within the cylinder 50 and rigidifies the strut 24. The higher level impact forces are then transferred from the strut 24 to the frame rail 18 through the plate 90. The forward portion of the frame rail will thereupon crush or mechanically deform to absorb such higher level impact forces up to the predetermined higher level impact force limit. In the particular embodiment shown, the forward portion of the frame rail is set to crush approximately 6 inches and to absorb the higher level impact forces up to the higher level impact force limit. A limit of 26,000 pounds is equivalent to a barrier impact speed of 12 mph.

The shear ring 62 is set to fail when the predetermined higher level impact force limit is reached or exceeded. Thus, until such force limit occurs, the strut 24 remains rigidified so that the forward portion of the rail 18 absorbs the higher level impact forces through mechanical deformation.

When the piston 64 engages the shear ring 62, the free end of the piercing rod 108 is spaced approximately one-half inch from the diaphragm 92. This half inch of travel can only occur when the shear ring 62 fails. When the higher level impact force limit is reached or exceeded, piston 64 shears the portion of ring 62 within cylinder 50 and moves the sheared portion into engagement with a radial shoulder 110 of cylinder 54. The piercing rod 108 moves into engagement with the diaphragm 92, ruptures the central portion of the diaphragm along the groove 94, and swings the central portion out of the way about the ungrooved portion which functions as a hinge. The fluid medium within cylinder 40 then flows through the tube 102 to the diffuser 104 and to the cushion 14 to inflate the cushion.

Figure 4:
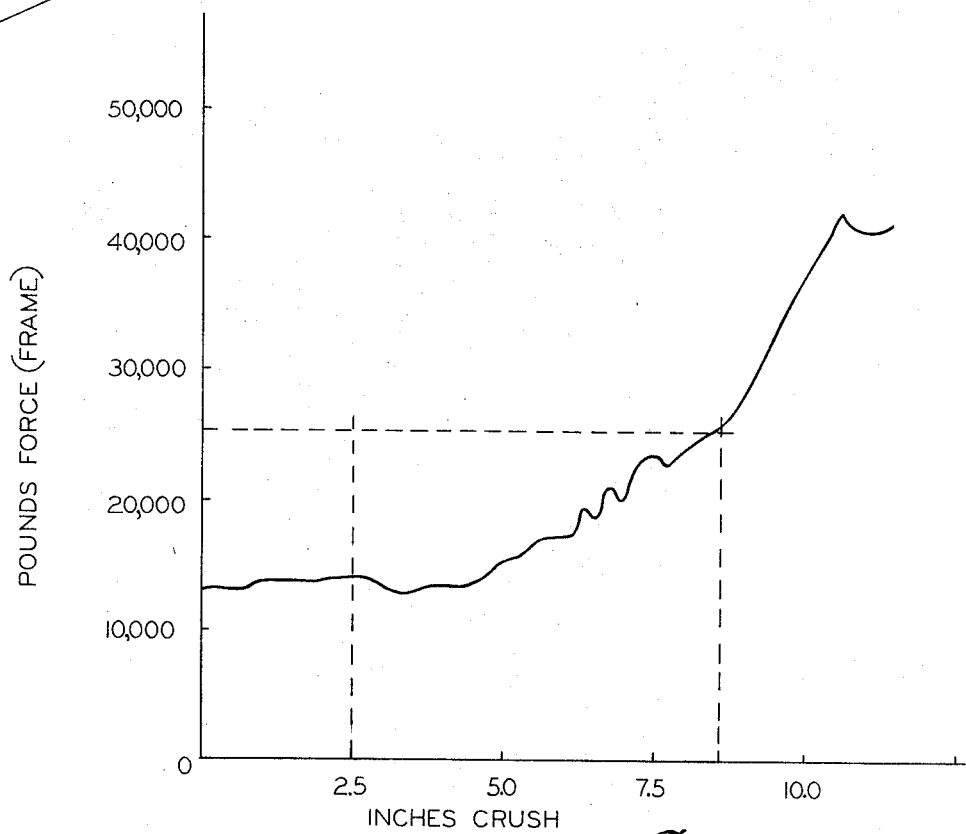
FIG. 4 is a diagram.

The foregoing operation will now be further described with reference to the diagram of FIG. 4.

Up to 2½ inches of crush, or 2½ inches of movement of the impact bar 22 relative to the front end of the vehicle, the forces are lower level and remain approximately constant at 12,000 pounds measured at each of the frame rails. This force level is equivalent to a barrier impact speed of 5 miles per hour. The presurization of the fluid medium within the cylinder 40 is adequate to absorb such lower level impact forces and restore the strut 24 when the impact forces cease. At approximately 2½ inches of crush or 2½ inches of movement of the piston 64 within the cylinder 50, the piston will engage the shear ring 62, as previously described, and the frame rail 18 will mechanically deform up to as much as 6 inches to thereby absorb higher level impact forces up to approximately 26,000 pounds. When such a force level is reached, the frame rails 18 have reached their energy absorbing limit and no longer have the capability of absorbing energy by mechanical deformation. At this limit, the shear ring 62 fails and the cushion 14 is deployed.

The force level or equivalent barrier impact speed at which the cushion is deployed is set by setting the failure level of the shear ring 62. Likewise, the force level or equivalent barrier impact speed at which the frame rail 18 is mechanically deformed is set by setting the spacing between the piston 64 and shear ring.

From the foregoing description, it can be seen that the shear ring functions as a mechanical sensor to set the point at which the cushion is inflated.

Thus, this invention provides an improved occupant restraint system.

We claim:

1. The combination comprising, an automotive vehicle having an inflatable occupant restraint, a frame including a controlled mechanically deformable portion capable of absorbing higher level impact forces up to a higher force level limit, an impact member receptive of impact forces, a strut including a piston member movable within a cylinder member, means securing one of said members to said impact member and the other of said members to said deformable portion of the frame to mount said impact member thereon, means operable upon movement of the piston member wihin the cylinder member for absorbing lower level impact forces received by the impact members, a shearable member engageable by the piston member to limit the range of movement thereof and set a lower level force absorption limit, said shearable member rigidifying said strut and being capable of transferring higher level impact forces up to said higher force level limit from said impact member to said deformable portion of the frame to deform such portion and absorb such forces when said piston member has moved through said range and engages said shearable member, and means operable by said piston member upon shearing of said shearable member at said higher force level limit and additional movement of said piston member for inflating said occupant restraint.

2. The combination comprising, an automotive vehicle having an inflatable occupant restraint, a frame including a controlled mechanically deformable portion capable of absorbing higher level impact forces up to a higher level impact force absorption limit, and an impact member receptive of impact forces, energy absorbing means including telescopic piston and cylinder members, means securing one of said telescopic members to said impact member and the other of said telescopic members to said deformable portion of the frame, said cylinder member including an energy absorbing pressurized fluid medium and said piston member including a wall member movable within the medium under impact forces received by the impact member for absorbing the energy of such impact forces, a shear member engaged by the wall member to limit the range of movement of the piston member and set a lower level impact force absorption limit, engagement of said wall member with said shear member under higher level impact forces exceeding said lower limit transferring such higher level impact forces to said deformable portion of the frame to deform such portion, said shear member being capable of transferring such higher level impact forces up to said higher level limit and being sheared by said wall member when said limit is exceeded to permit further movement of said piston member, passage means communicating said cylinder member with said restraint, means normally blocking said passage means, and means operable by said piston member upon further movement thereof for removing said blocking means to inflate said occupant restraint by said fluid medium when the impact forces exceed said higher level impact force absorption limit.

3. The combination comprising, an automotive vehicle having an inflatable occupant restraint, a frame, and an impact member receptive of impact forces, energy absorbing means including a pair of relatively movable members, one member including an energy absorbing medium and the other member being movable relative to the medium for absorbing lower level impact forces within a first range up to a lower level force absorption limit, releasable means limiting the relative movement of said members to said first range, said frame including a controlled mechanically deformable portion for absorbing higher level impact forces within a second range up to a higher level force absorption limit, means securing one of said members to said impact member and the other of said members to said deformable frame portion, said impact member and said one member being movable relative to said deformable frame portion and said other member to absorb lower level impact forces within said first range up to said lower level force limit, said impact member, said one member, and said other member moving as a unit relative to said deformable frame portion under higher level impact forces to deform said deformable frame portion and absorb higher level impact forces up to said higher level force limit, said limiting means releasing said relatively movable members for movement through a third range when the impact forces exceed said higher level force limit, and means operable by said relatively movable members upon relative movement thereof through said third range for inflating said occupant restraint.

4. The combination comprising, an automotive vehicle having an inflatable occupant restraint, a frame, and an impact member receptive of impact forces, energy absorbing means including a pair of relatively moveable members, one member including an energy absorbing medium and the other member being movable relative to the medium for absorbing lower level impact forces within a first range up to a lower level force absorption limit, means engageable by said other member to limit the relative movement of said members to said first range, said frame including a controlled mechanically deformable portion for absorbing higher level impact forces within a second range up to a higher level force absorption limit, means securing one of said members to said impact member and the other of said members to said deformable frame portion, said impact member and said one member being movable relative to said deformable frame portion and said other member to absorb lower level impact forces within said first range up to said lower level force limit, said impact member, said one member, and said other member moving as a unit relative to said deformable frame portion under higher level impact forces to deform said deformable frame portion and absorb higher level impact forces up to said higher level force limit, means removing said engageable means to release said relatively movable members for movement through a third range when the impact forces exceed said higher level force limit, and means operable by said relatively movable members upon relative movement thereof through said third range for inflating said occupant restraint.

5. The combination comprising, an automotive vehicle having an inflatable occupant restraint, a frame including a controlled mechanically deformable portion capable of absorbing higher level impact forces up to a higher force level limit, and an impact member receptive of impact forces, a pair of relatively movable members, means securing one of said members to said impact member and the other of said members to said deformable portion of the frame to mount said impact member thereon, means operable upon relative movement of the members for absorbing lower level impact forces received by the impact bar, means limiting the range of relative movement of said members to set a lower level force absorption limit and cause said relatively movable members and impact member to move as a unit relative to said deformable portion under higher level impact forces to deform said deformable portion and absorb such forces up to said higher force level limit, means operable by said members upon additional relative movement thereof for inflating said occupant restraint, and means releasing said limiting means and permitting such additional relative movement of said members to inflate said restraint when the impact forces exceed said higher force level limit.

6. The combination comprising, an automotive vehicle having an inflatable occupant restraint, a frame including a controlled mechanically deformable portion capable of absorbing higher level impact forces up to a higher force level limit, an impact member receptive of impact forces, a pair of relatively movable members, means securing one of said members to said impact member and the other of said members to said deformable portion of the frame to mount said impact member thereon, means operable upon relative movement of the members through a first range for absorbing lower level impact forces received by the impact bar, shearable means engageable between said members upon movement thereof through said first range to block additional relative movement thereof and thereby set a lower level force absorption limit, said shearable means and said relatively movable members thereafter transferring higher level impact forces from said impact member to said deformable portion of the frame to deform such portion and absorb such forces up to said higher force level limit, said shearable means being shearable by said members when said higher force level limit is exceeded to permit said relatively movable members to additionally move relative to each other, and means operable by said members upon said additional relative movement thereof for inflating said occupant restraint.

7. The combination comprising, an automotive vehicle having an inflatable occupant restraint, a frame including a controlled mechanically deformable portion capable of absorbing high level impact forces within a range up to a high level force limit, an impact member receptive of impact forces, a pair of relatively movable members, means securing one of said members to said impact member and the other of said members to said deformable frame portion to mount said impact member thereon, energy absorbing means operative upon relative movement of said members through a set range to absorb low level impact forces up to a low level force limit, means operative upon movement of said members through said set range to block further relative movement of said members whereby said members and said impact member thereafter move as a unit relative to said deformable portion of the frame under the high level impact forces to deform such frame portion and absorb such high level forces up to said high level force limit, means removing said blocking means and permitting further relative movement of said members when the impact forces exceed said high level force limit, and means operable by said members upon further relative movement thereof for inflating said occupant restraint.

* * * * *